Dec. 4, 1934.  F. W. SPERR, JR  1,983,320
PRODUCTION OF AMMONIA COMPOUNDS
Filed June 4, 1931
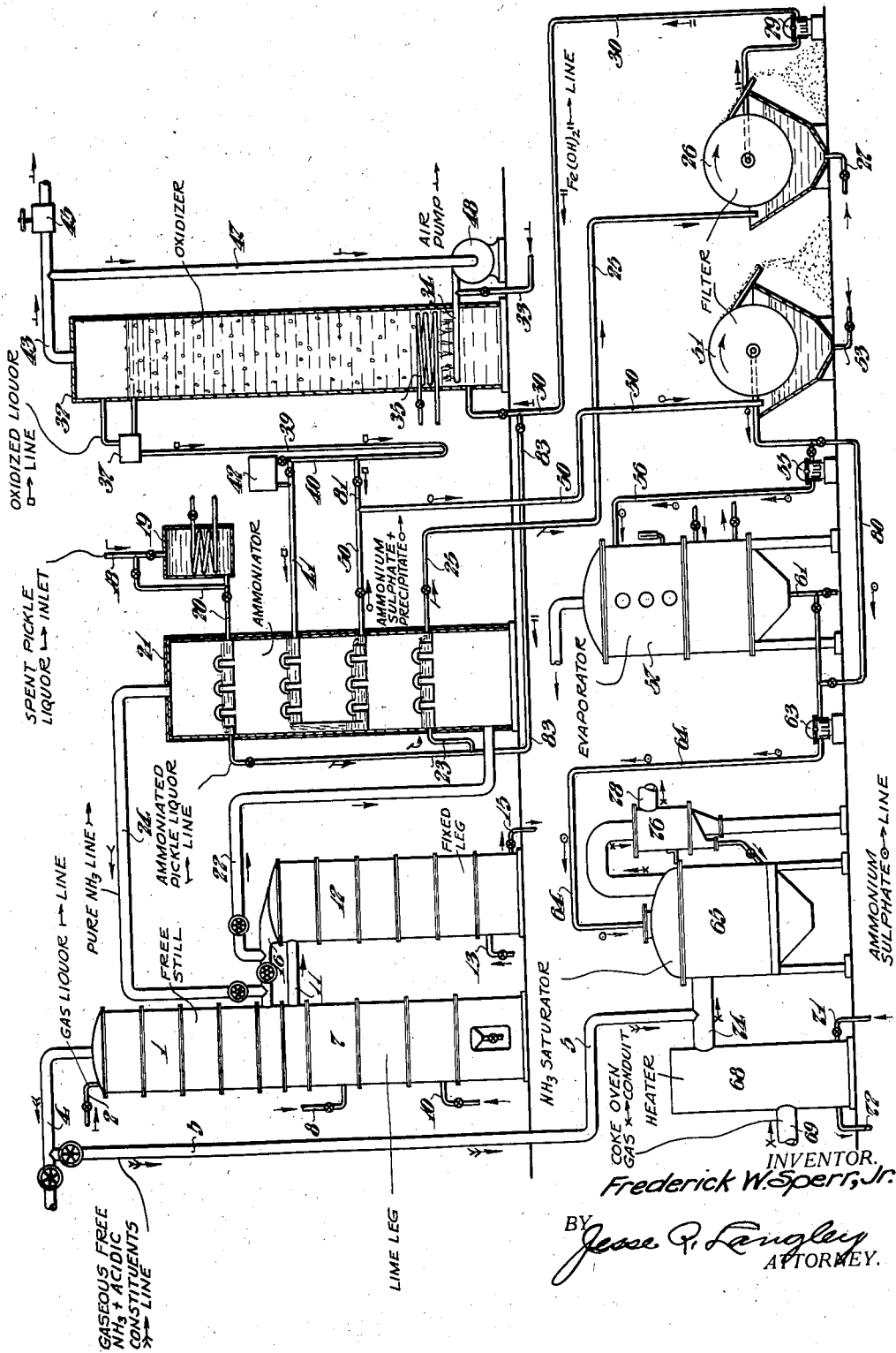
INVENTOR.
Frederick W. Sperr, Jr.
BY Jesse P. Langley
ATTORNEY.

Patented Dec. 4, 1934

1,983,320

UNITED STATES PATENT OFFICE 1,983,320

PRODUCTION OF AMMONIA COMPOUNDS

Frederick W. Sperr, Jr., Phoenix, Ariz., assignor to The Koppers Company of Delaware, a corporation of Delaware Application June 4, 1931, Serial No. 541,993

11 Claims. (Cl. 23—119)

This invention relates to the production of useful compounds of iron and of ammonia, and especially to the utilization of spent pickling liquor and analogous liquids in the production of ammonium salts and useful iron compounds, both of which are substantially free from impurities.

It has been general practice in the preparation of iron or steel sheets, tubes, castings, etc., for galvanizing or tinning, and sometimes merely to clean them, to pickle such objects in a bath of weak acid or to contact them with an acid solution in some other suitable manner. Sulphuric acid is the acid most frequently used in the pickling liquor, but hydrochloric acid and other acids are sometimes used. The acid dissolves the oxides of iron which are formed when hot iron or steel comes in contact with air or moisture, and may also dissolve some of the metal itself, to form a solution of salts such as ferrous and ferric sulphates or chlorides, in which the ferrous salts predominate.

Fresh acid may be added to this pickling liquor, which is then employed in the treatment of more sheets, castings or the like. This procedure is repeated until the liquor becomes too dirty or saturated with salts to be satisfactory for further use, and part or all of it is then replaced with a fresh acid solution. The replaced solution, known as waste or spent pickling liquor, must then be disposed of, and in many instances, providing suitable means of disposal is a serious problem.

Typical spent pickling liquor discharged from a system in which sulphuric acid has been used for acidification has a specific gravity of about 1.2 and contains ferrous sulphate ($FeSO_4$) amounting to about 25% or 30%—for example, 27.5%—and free sulphuric acid amounting to about 0.9% or 1%. If HCl has been used for acidifying the bath, the spent liquor contains chlorides and free hydrochloric acid.

In most cases, wasting this spent pickle liquor to streams and the like is not permissible because of the salts and free acid which it contains. Consequently it has been necessary to provide other means of disposal. Among the methods devised in the past for this purpose are neutralization of the liquor with iron followed by concentration to recover iron salts, and precipitation of the iron with lime.

However, since the principal source of spent pickling liquor and analogous acidic solutions of iron salts is the iron and steel industry, and since ammonia is available at or near many iron and steel plants as a by-product of the production of coke for metallurgical purposes, this ammonia being recovered and utilized chiefly in the form of salts, such as ammonium sulphate, the possibility of combining such ammonia with spent pickling liquor and the like has frequently been considered. For example, it has already been suggested that pickling liquor be treated with raw coke oven gas or other fuel gases, or with ammoniacal liquor condensed therefrom, to recover ammonia originally contained in the gas.

The ammonia is thereby recovered in the form of sulphate or other salt, and much of the iron is proposed to be recovered as a hydrate, which may be sintered or otherwise treated in preparation for use as a substitute for iron ore, or for other purposes. It has been found, however, that when the pickling liquor is treated with raw fuel gas or crude ammonia liquor the final products are contaminated with sulphides, cyanides, and/or other undesirable impurities unless the gas is previously treated to remove $H_2S$, HCN, and analogous acidic constituents. This extra treatment materially increases the cost of such processes.

An object of my present invention is to provide an improved process of utilizing spent pickling liquor and analogous solutions of iron salts.

A second object of my invention is to provide an improved process of recovering ammonia from fuel gas.

Another object of my invention is to provide a process whereby ammonia removed from fuel gas in the form of ammoniacal gas liquor is economically recovered in the form of valuable salts, and suitable apparatus therefor.

A further object of my invention is to provide a process wherein spent pickling liquor and similar solutions are utilized in connection with the recovery of ammonia obtained from fuel gas to produce useful ammonium salts and iron compounds substantially free from impurities, and suitable apparatus therefor.

My invention has for further objects such other operative advantages and results as are found to obtain in the process hereinafter described and claimed.

In my present invention the difficulties previously encountered in attempting to utilize pickling liquor and the like in the recovery of ammonia from fuel gases are overcome by treating the pickling liquor with ammonia vapor from the fixed leg of an ammonia still of the type generally used in coke plants to recover ammonia from gas liquor and analogous liquids containing it in both free and fixed form. Such vapors consist essentially of ammonia and steam, and are normally quite free from $H_2S$, $HCN$, $CO_2$ and analogous impurities.

Substantially complete freedom from such impurities can readily be ensured if desired as described in my co-pending application Serial No. 495,641, filed November 14, 1930, now Patent No. 1,928,510, issued Sept. 26, 1933. The present process therefore makes it possible to obtain products substantially free from foreign substances.

In the practice of my present invention, spent pickling liquor which may be of the sulphate type, for example, is contacted with vapors from a fixed ammonia still in some suitable apparatus, such as an absorption tower of the bell-and-tray type. The ammonia reacts with constituents of the liquor to form a precipitate of ferrous hydrate, $Fe(OH)_2$, suspended in a solution of ferrous sulphate, $FeSO_4$, and ammonium sulphate, $(NH_4)_2SO_4$. The remaining vapor, which contains little or no ammonia, may thus be passed into the free ammonia still where it removes free ammonia and other volatile constituents from a further quantity of ammonia liquor in the usual manner.

In this part of the process, ammonia and $FeSO_4$ react to form ammonium sulphate in solution and to precipitate $Fe(OH)_2$. This reaction is reversible, but by overtreating with ammonia, equilibrium may be reached when about 60% to 80% of the iron is converted to the insoluble ferrous hydrate. Overtreating also makes it easier to filter out the ferrous hydrate precipitate.

The liquor is withdrawn from the absorber and filtered, preferably while still hot. The filtrate contains $FeSO_4$ and ammonium sulphate and is usually green in color. It is then oxidized, as by aeration, preferably under pressure and while hot, to convert the remaining iron to the ferric state.

This oxidation converts the ferrous compounds, $Fe(OH)_2$ and $FeSO_4$, to ferric sulphate, $Fe_2(SO_4)_3$, and ferric hydrate, $Fe(OH)_3$ or $Fe_2(OH)_6$. It is highly desirable that the $Fe(OH)_2$ be removed as completely as possible before oxidation, as the reaction between ammonia and ferrous sulphate is reversible and if the ferrous hydrate is not removed ammonia may be liberated and carried away during aeration.

The oxidized liquor is withdrawn from the aerating tower or other oxidizing device for further ammoniation, which is preferably performed in a part of the ammoniator or absorber previously used. This second ammoniation converts ferric sulphate to insoluble $Fe(OH)_3$, and simultaneously forms a further quantity of $(NH_4)_2SO_4$. If the iron has been sufficiently oxidized to the ferric state, precipitation of iron remaining in the liquor is substantially complete.

After the second ammoniation, the solution is filtered again and an ammonium sulphate solution substantially free from iron is produced. This solution may be concentrated to recover ammonium sulphate crystals, or run into the ammonia saturator where the salt is recovered with ammonium sulphate otherwise produced, or it may be otherwise disposed of.

The iron precipitate from both filtrations consists essentially of iron hydrates and is practically free from insoluble impurities. It may be washed or repulped if desired, however, and it may then be sintered or otherwise prepared for consumption as pigment, or to replace iron ore, or for other purposes.

I now describe with reference to the accompanying drawing a preferred method of practicing my improved process of producing ammonium salts and useful iron compounds from ammonia vapor and spent pickling liquor or the like. In the drawing, The single figure is a somewhat diagrammatic view partly in elevation and partly in vertical section of apparatus suitable for the practice of my invention.

Ammoniacal liquor, such as gas liquor produced by cooling and partially condensing raw fuel gas, enters a free ammonia still 1 through a pipe 2. The liquor passes downwardly through this still in intimate contact with a countercurrent flow of steam or other hot vapor or gas which removes free ammonia and other volatile constituents such as $H_2S$ and $CO_2$, from the liquor. These constituents pass with the vapor from the top of the still through a pipe 4 and may be returned through a pipe 5 to an appropriate point in the gas stream.

The liquor, substantially free from free ammonia and other volatile constituents, continues from the free still 1 into a lime leg or liming chamber 7, which may conveniently be located below the free still. In this liming chamber 7 the liquor is mixed with milk of lime or other alkaline material introduced through a pipe 8 which converts fixed ammonia contained in the liquor to the free form, and fixes acidic constituents remaining in the liquor in the form of salts.

The mixture of lime and liquor may be agitated and/or heated if necessary by steam admitted to the liming chamber through a pipe 10, and it then passes through a pipe 11, which may be provided with a pump, if necessary, to overcome the back pressure of the absorber, into a fixed ammonia still 12. In this still the liquor is subjected to further distillation with steam supplied through a pipe 13, which removes ammonia remaining in the liquor. Still waste substantially free from ammonia passes from the bottom of the fixed still 12 through a pipe 15, and vapor consisting essentially of steam and ammonia leaves the top of the fixed still through a pipe 16.

Spent pickling liquor or some other acid solution of iron salts flows through a pipe 18, a solution heater 19, and a pipe 20, or bypasses the heater through pipes 18 and 20, into an absorbing tower or ammoniator 21, which may be of the bell-and-tray type as shown, or of some other suitable form. This liquor enters the upper section or sections of the absorber 21, and is there intimately contacted with ammonia vapor and steam supplied to the absorber from the fixed still 12 through pipes 16 and 22. From the upper section of the absorber the liquor passes through a pipe 23 to a bottom section, where it is brought into contact with ammonia vapor just after it enters the absorber.

By this means the previously unammoniated liquor entering the absorber is contacted with hot vapors from which part of the ammonia has been removed in the lower sections of the ammoniator, and removal of ammonia from these vapors is thereby made as complete as possible. By returning this liquor to the lowest section of the scrubber, where it is contacted with vapor having the highest ammonia content, the highest possible ammoniation of the liquor is obtained.

Vapor substantially free from ammonia passes from the top of the absorber through a pipe 24, and may then be introduced into the bottom of the free still 1 or otherwise disposed of as desired. Part of the vapor from the fixed still 12 may be allowed to pass directly through pipe 16 into the free still. The absorber or ammoniator 21 and the connections thereto should be thoroughly insulated to reduce heat losses to the minimum.

Ammoniated liquor containing ferrous sulphate and ammonium sulphate in solution and ferrous hydrate in suspension and in solution is withdrawn from the lower section of the ammoniator 21 through a pipe 25, and delivered to a filter 26, which is preferably of the continuous type. Liquor in the reservoir of this filter may be agitated and/or heated, as by air or steam supplied through a pipe 27, if desired.

In this filter 26, the insoluble ferrous hydrate is substantially completely removed and the clear filtrate and wash water are withdrawn by a pump 29 and delivered through a pipe 30 to the oxidizing stage. This filtration is preferably completed without cooling the liquor, as hot filtration facilitates removal of the precipitate and washing the filter cake, and reduces the amount of wash water required for that purpose.

The oxidizing stage of the process may be conducted in any suitable type of apparatus, but I have found that a relatively tall pressure aerator 32 having a relatively small cross-sectional area, is in most instances preferable. The filtrate enters the aerator 32 near the bottom and passes upwardly concurrently with compressed air, which is introduced through a pipe 33 and a perforated pipe 34 or other suitable distributing means. The aerator is preferably insulated and may be heated if desired, as by means of a steam coil 35.

While passing upwardly through this device in intimate contact with the air, ferrous compounds in the solution are converted to ferric compounds, which are usually $Fe_2(SO_4)_3$ and insoluble $Fe(OH)_3$. The oxidized solution passes from the top of the aerator through a vent tank and/or level regulator 37 or other suitable discharge device, and continues through pipes 39, 40 and 41, preferably to an intermediate section of the ammoniator 21. If desired, the oxidized liquor may be passed from pipe 40 through a solution heater 42 and then into pipe 41 on its return to the ammoniator, or the ammoniator itself may be heated.

The air passes from the top of the pressure aerator through a pipe 43 and may be discharged to the atmosphere directly, or through a pressure reducing valve 45, or it may be recirculated entirely or in part through a pipe 47 and a blower 48 into the bottom of the aerator. By recirculating part of the air in this manner, a considerable saving in power is effected, as it is only necessary to compress the air once, and it is then contacted with the liquor several times, making possible the utilization of a much larger percentage of its oxygen content.

It is preferable to maintain the aerator under pressure, as stated hereinabove, as oxidation of ferrous compounds to ferric is more rapid at higher pressures. However, the oxidation may alternatively be carried out at substantially atmospheric pressure in this type of aerator, and other types of oxidizing equipment may be used at atmospheric or higher pressures. Oxidizing agents other than air, such as pure or impure oxygen, ozone, and other chemical oxidizing agents, may also be used, or electrolytic oxidation may be employed, but oxidation with air is usually preferable from an economic standpoint.

The oxidized liquor, which contains ammonium sulphate and ferric sulphate and hydrate, is subjected to a second ammoniation in the intermediate sections of the ammoniator 21. Insoluble ferric hydrate and a further quantity of ammonium sulphate are produced by the reaction of the $Fe_2(SO_4)_3$ with ammonia.

When oxidation of the ferrous iron to ferric iron in the aerator 32 is complete, precipitation of the iron remaining in the solution is substantially completed by this second ammoniation, and even when the iron is not completely oxidized comparatively complete precipitation may be obtained because of the formation of intermediate iron hydrates less soluble than ferrous hydrate, as described hereinbelow.

The liquor is then withdrawn from the ammoniator through a pipe 50 and delivered to a filter 51, which may be a pressure filter, or a filter of the continuous type shown, or of any other suitable type. This liquor may also be agitated and/or heated in the reservoir of the filter by air or steam admitted through a pipe 53, if desired. The ferric hydrate is separated from the solution by this filter 51, and filtrate consisting of ammonium sulphate solution substantially free from iron is delivered by a pump 55 through a pipe 56 into an evaporator 57, which is preferably of the multiple-effect crystallizing type.

In the evaporator 57 the ammonium sulphate solution is concentrated to the crystallizing point or to some lesser concentration. It is then discharged from the bottom of the evaporator through a pipe 61 and cooled or otherwise treated to recover the crystalline salt, or crystallization may take place in the evaporator and a slurry is then withdrawn. This slurry is then centrifuged or otherwise treated to separate the salt from the mother liquor, and the mother liquor is returned to the evaporator or otherwise disposed of. As a further alternative, the liquor may be delivered by a pump 63 through a pipe 64 to an ammonium sulphate saturator 65 wherein the salt is recovered.

Fuel gas which has preferably been previously cooled or scrubbed to remove tar and fixed ammonium compounds, enters a reheater 68 through a pipe 69. This heater 68 may be heated by means of steam supplied through a pipe 71 and discharged through a pipe 72. The heated gas passes from the reheater through a pipe 74 in which it may be combined with ammonia still vapors from the pipe 5.

The gas then enters the saturator 65, in which free ammonia is removed by a bath of sulphuric acid or other suitable acid material with which the gas is contacted. The gas continues from the saturator through an acid separator 76 and a pipe 78 for further purification or other disposal.

In some instances it may be preferable to omit concentration of the $(NH_4)_2SO_4$ solution in the evaporator 57 and to pass it directly from the filter 51 through pipe 80, pump 63 and pipe 64 into the saturator 65, where it is concentrated entirely by the gas. In that case, or when the ammonium sulphate solution prepared from pickle liquor is partially concentrated in the saturator, the gas entering the saturator must be dried or preheated to a greater extent than is otherwise necessary, or stronger acid must be used in the saturator bath.

If a small amount of insoluble iron is permissible in the ammonium sulphate recovered, the oxidized solution is passed from pipe 39 through pipe 81 into pipe 50 and directly to the filter 51. After filtration, the liquor is subjected to the second ammoniation, and is then removed and concentrated as before. The precipitate is more easily removed before the second ammoniation, and for many purposes the small amount of insoluble iron present in the ammonium sulphate then recovered is not detrimental. If soluble iron is not objectionable, the second ammoniation may be omitted entirely.

Similarly, the liquor may be withdrawn and concentrated at various other stages to recover new types of ferruginous fertilizers containing various amounts of soluble and/or insoluble iron compounds. For example, the suspension produced by the first ammoniation, the filtrate from the first filtration, or the suspensions produced by oxidation and by the second ammoniation may be concentrated and crystallized. Another modification is the fractional crystallization of the filtrate from the first filtration to separate ammonium sulphate from ferrous ammonium sulphate, the latter being returned to the ammoniator, if desired.

As a further alternative, the spent pickling liquor may be oxidized before ammoniation. If oxidation is sufficient, a single ammoniation and filtration results in an ammonium sulphate solution substantially free from iron. The oxidation is relatively slow in this case, however, which makes it necessary to use a larger aerator and increases the consumption of power for air compression. Furthermore, the amount of apparatus handling solutions of iron in the ferric state is increased, and since these solutions are generally corrosive to iron and steel, the cost of equipment would be increased, as lead lined or other corrosion-resisting construction would be necessitated throughout.

If desired, a cone tank or analogous settling device may be inserted between the oxidizing apparatus and the second stage of ammoniation. Clear oxidized liquor then overflows from the top of this separator to the reammoniator, where it is treated as described hereinabove, and the precipitate formed during oxidation is transferred as a sludge from the bottom of the separator to a lower section of the ammoniator, such as the bottom section of the ammoniator 21.

By this procedure, most of the Fe(OH)$_3$ is transferred to the first filter 26, where it is more readily handled along with the large amount of more easily filterable Fe(OH)$_2$ than it is in the second filter 51, where Fe(OH)$_3$ is removed alone. Furthermore, the presence of Fe(OH)$_3$ during the first ammoniation tends to increase the absorption of ammonia and the extent to which iron is precipitated in that stage, perhaps because of the formation of an intermediate hydroxide which is less soluble than the straight ferrous hydroxide, Fe(OH)$_2$.

If there is so much precipitate in the suspension in the bottom section of the ammoniator 21 that it is difficult to handle or that it settles out, part of the filtrate withdrawn from the first filter 26 may be returned to this section, as through a pipe 83 connecting pipes 30 and 23, to increase the fluidity of the suspension. This result is also obtained by omitting one of the filters and the separate sections of the ammoniator used for reammoniation, recirculating liquor through the aerator and back into the bottom of the ammoniator, and then filtering and concentrating the solution. This latter procedure is apt to result in contamination of the recovered ammonium sulphate with ferrous sulphate, however, unless the oxidizing apparatus has very high efficiency, and may also lead to losses of ammonia during oxidation, unless very high pressures are used.

I have also found that the oxidation and reammoniation steps can be eliminated entirely by treating the first filtrate with raw coke oven gas or other gas or vapor containing ammonia and H$_2$S or the like, as described in my copending application Serial No. 541,992, filed June 4, 1931. In that case, part of the iron is recovered in the form of sulphide instead of hydrate. Contamination of the final products with ferrocyanides can be prevented by treating the filtrate with a slight excess of untreated pickle liquor and refiltering, or by previous removal of HCN from the gas, as described in the copending application of Caleb Davies, Jr., Serial No. 535,637, filed May 7, 1931, now Patent No. 1,942,050, issued Jan. 2, 1934.

As stated hereinabove, it is preferable in the present process to maintain the ammoniator, aerator, etc., at an elevated temperature, approximating the temperature of the ammonia still vapors, such as from 90° to 105° C., for example, by insulation and by providing additional heat when necessary. This prevents condensation of the vapor, and thus reduces the amount of additional steam required for concentrating the solution and for operation of the free ammonia still.

Substantially similar results can be obtained when the liquor is allowed to cool, however, except that the iron hydrate suspensions are somewhat more difficultly filtered, and steam consumption is increased. These disadvantages are offset at least in part by the fact that at lower temperatures the equilibrium in the reaction between ammonia and FeSO$_4$ is shifted so that more complete precipitation of the iron is obtained by the first ammoniation.

The iron hydrates, Fe(OH)$_2$ and Fe(OH)$_3$, recovered in this process may be calcined and utilized as pigment in the paint industry, or sintered and used to replace iron ore in the production of iron. The ferric hydroxide, at least, is also suitable for use in the dry or wet purification of fuel gas from H$_2$S and the like. In preparation for this latter use, the precipitates may be further oxidized, as by mixing with shavings and piling in the air.

In the process described hereinabove, ammonia vapor substantially free from H$_2$S and the like is obtained from a fixed ammonia still and employed with iron salt solutions in the production of ammonium salts and iron compounds. My invention is not limited to the use of ammonia from this source, however, and I may use ammonia of suitable purity from other sources. For example, the vapors leaving the free still 1 through pipe 4 may be passed through a purifying or desulphurizing stage, and used to supplement or replace the ammonia vapor from the fixed still 12 in the ammoniator 21. Vapors leaving the ammoniator may be returned to the bottom of the free still as before. A much larger amount of ammonia is thus made available for treatment of the pickling liquor.

Certain other modifications in the several parts of my apparatus and the several steps of my process, in addition to those mentioned hereinabove can be made without departing from the spirit of my invention, and it is my intention to cover in the claims such modifications as are included within the scope thereof.

I claim as my invention:

1. The process of manufacturing ammonium salts, which comprises contacting ammonia vapor substantially free from acidic constituents with an iron salt solution to precipitate iron hydrate and to form ammonium salt, removing iron hydrate from the solution, oxidizing the solution to convert ferrous compounds to ferric compounds, removing the iron precipitate after said oxidation, ammoniating the oxidized solution to precipitate a further quantity of iron hydrate, and recovering ammonium salt from the solution.

2. The process of manufacturing ammonium salts, which comprises contacting ammonia vapor substantially free from acidic constituents with an iron salt solution to precipitate iron hydrate and to form ammonium salt, removing precipitated iron hydrate from the solution, oxidizing the solution to convert ferrous compounds to ferric compounds, ammoniating the oxidized solution to precipitate ferric hydrate, removing precipitated ferric hydrate from the solution, and concentrating the solution to recover ammonium salt substantially free from impurities.

3. The process of manufacturing ammonium salts and iron compounds, which comprises contacting an acid solution containing iron salt with ammonia vapor substantially free from acidic constituents to form ammonium salt and insoluble ferrous hydrate, removing ferrous hydrate from the solution, oxidizing the solution, treating the oxidized solution with a further quantity of ammonia vapor substantially free from acidic constituents to form ferric hydrate and a further quantity of ammonium salt, removing ferric hydrate from the solution, concentrating the solution in contact with a gas, and recovering ammonium salt from the solution.

4. The process of separately recovering ammonium sulphate and ferric hydrate from a spent acidic pickling solution containing ferrous sulphate which comprises: bringing ammoniacal vapors substantially free from acidic constituents into contact with the spent acidic pickling solution containing ferrous sulphate to effect the fixation of ammonia therein as ammonium sulphate and the precipitation of ferrous hydrate, removing said ferrous hydrate, oxidizing the solution to convert ferrous constituents to insoluble ferric hydrate, and removing said ferric hydrate from the solution.

5. In the process of separately recovering ammonium sulphate from gas liquor containing both volatile and non-volatile ammonia and spent pickling solution, the steps which comprise initially steam distilling said liquor to remove volatile ammonia and acidic constituents, then decomposing non-volatile ammonium compounds to convert ammonia contained therein into volatile form, then steam distilling said partially distilled liquor, removing liberated vapors of ammonia and steam but containing substantially no acidic impurities, subjecting them to contact with the aforesaid pickling solution comprising an acid solution of iron sulphate to accomplish the combination of the ammonia from said vapors with the acid of said pickling solution, and effecting with the residual vapors from the last mentioned step the aforesaid initial steam distillation of said liquor.

6. In the process of separately recovering ammonium sulphate from gas liquor containing both volatile and non-volatile ammonia and spent pickling solution, the steps which comprise initially steam distilling said liquor to remove volatile ammonia and acidic constituents, then decomposing non-volatile ammonium compounds to convert ammonia contained therein into volatile form, then steam distilling said partially distilled liquor, removing liberated vapors of ammonia and steam but containing substantially no acidic impurities, subjecting them to contact with the aforesaid pickling solution comprising an acid solution of iron sulphate maintained at a temperature not substantially below that of said vapors to accomplish the combination of the ammonia from said vapors with the acid of said pickling solution, and effecting with the residual vapors from the last mentioned step the aforesaid initial steam distillation of said liquor.

7. In the process of separately recovering ammonium sulphate from gas liquor containing both volatile and non-volatile ammonia and spent pickling solution, the steps which comprise initially steam distilling said liquor to remove volatile ammonia and acidic constituents, then decomposing non-volatile ammonium compounds to convert ammonia contained therein into volatile form, then steam distilling said partially distilled liquor, removing liberated vapors of ammonia and steam but containing substantially no acidic impurities, subjecting them to contact with the aforesaid pickling solution comprising an acid solution of iron sulphate to accomplish the combination of the ammonia from said vapors with the acid of said pickling solution, and the precipitation of ferrous hydrate, removing the solution from contact with the vapors, removing said ferrous hydrate precipitate therefrom, oxidizing the solution to convert iron contained therein to ferric form, again subjecting the oxidized solution to contact with said vapors to complete the precipitation of ferric iron, and effecting with the residual vapors from the last mentioned step the aforesaid initial steam distillation of said liquor.

8. In the process of separately recovering ammonium sulphate from gas liquor containing both volatile and non-volatile ammonia and spent pickling solution, the steps which comprise initially steam distilling said liquor to remove volatile ammonia and acidic constituents, then decomposing non-volatile ammonium compounds to convert ammonia contained therein into volatile form, then steam distilling said partially distilled liquor, removing liberated vapors of ammonia and steam, but containing substantially no acidic impurities, subjecting them to contact with the aforesaid pickling solution comprising an acid solution of iron sulphate to accomplish the combination of the ammonia from said vapors with the acid of said pickling solution, and effecting with the residual vapors from the last mentioned step the aforesaid initial steam distillation of said liquor, removing said ammoniated solution, oxidizing and separating iron compounds therefrom in insoluble form, removing said insoluble iron compounds and recovering thereby purified ammonium sulphate from the solution.

9. In the process of fixing ammonia by means of an acid solution of ferrous sulphate such as spent pickling liquor or the like, the steps which comprise treating said solution with substantially pure gaseous ammonia to cause the formation of ammonium sulphate and the precipitation of ferrous hydrate, removing said ferrous hydrate and then oxidizing the solution to effect the conversion of iron contained therein to the ferric form.

10. In the process of fixing ammonia by means of an acid solution of ferrous sulphate such as spent pickling liquor or the like, the steps which comprise treating said solution with substantially pure gaseous ammonia to cause the formation of ammonium sulphate and the precipitation of ferrous hydrate, removing said ferrous hydrate and then oxidizing the solution by treating the solution with an oxygen-containing gas under elevated temperature and pressure.

11. In the process of fixing ammonia by means of an acid solution of ferrous sulphate such as spent pickling liquor or the like, the steps which comprise treating said solution with substantially pure gaseous ammonia to cause the formation of ammonium sulphate and the precipitation of ferrous hydrate, removing said ferrous hydrate and then oxidizing the solution to effect the conversion of iron contained therein to the ferric form, again subjecting the solution to ammoniation to complete the precipitation of iron as ferric hydrate, and removing said ferric hydrate precipitate.

FREDERICK W. SPERR, Jr.